United States Patent
Flinchem

(10) Patent No.: US 8,331,861 B2
(45) Date of Patent: Dec. 11, 2012

(54) CONTENT DISTRIBUTION AND SYNCHRONIZATION TECHNIQUES AND DEVICES

(75) Inventor: Edward Flinchem, Seattle, WA (US)

(73) Assignee: Patent Navigation, Inc., Woodinville, WA (US)

( * ) Notice: Subject to any disclaimer, the term of this patent is extended or adjusted under 35 U.S.C. 154(b) by 741 days.

(21) Appl. No.: 11/642,323

(22) Filed: Dec. 20, 2006

(65) Prior Publication Data

US 2007/0143492 A1 Jun. 21, 2007

Related U.S. Application Data

(60) Provisional application No. 60/752,632, filed on Dec. 21, 2005.

(51) Int. Cl.
*H04B 7/00* (2006.01)

(52) U.S. Cl. ...................................... 455/41.2

(58) Field of Classification Search ................. 455/41.2, 455/550.1; 370/328
See application file for complete search history.

(56) References Cited

U.S. PATENT DOCUMENTS

| | | | |
|---|---|---|---|
| 6,826,699 B1* | 11/2004 | Sun | 726/5 |
| 7,212,785 B2* | 5/2007 | Brassil et al. | 455/41.2 |
| 7,298,714 B2* | 11/2007 | Foster | 370/315 |
| 7,523,507 B2* | 4/2009 | Leinonen et al. | 726/32 |
| 7,526,310 B2* | 4/2009 | Billmaier et al. | 455/550.1 |
| 2005/0076057 A1* | 4/2005 | Sharma et al. | 707/104.1 |

* cited by examiner

*Primary Examiner* — Matthew Anderson
*Assistant Examiner* — David Bilodeau
(74) *Attorney, Agent, or Firm* — FSP LLC

(57) ABSTRACT

A mobile device wirelessly detects another device that is proximate. The mobile device provides to the other device identifications of which content from a particular content source is stored by the mobile device. The mobile device provides to the other device content from the particular source that is stored by the mobile device but not the other device, and receives from the other device content from the particular source that is stored by the other device but not by the mobile device, so that upon conclusion of an interaction between the mobile device and the other device, each device comprises all of the content from the particular content source originally comprised en toto between the two devices.

7 Claims, 4 Drawing Sheets

CONTENT DISTRIBUTION AND SYNCHRONIZATION TECHNIQUES AND DEVICES

PRIORITY CLAIM

This application claims priority as a utility patent application corresponding to subject matter of U.S. Provisional Application 60/752,632, which is hereby incorporated by reference in its entirety.

BACKGROUND

Content downloads from online sources, such as Internet web sites or cellular service providers, have become very popular. They have become so popular, in fact, that significant burden to online infrastructure may result when new, popular content is posted, as people rush to download "hot" content. These spikes in demand may actually limit the distribution of content, because of resulting lengthy download delays.

It is often the case that certain content is popular among certain demographics and other social subgroups. For example, a music video by a particular rock band may be popular among certain teens in certain regions of the country. It is likely that groups of social acquaintances, or people that are likely to collect in a particular area, will appreciate and desire similar content.

DETAILED DESCRIPTION OF THE INVENTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Phones all with the property of having accounts with a subscription (rental, all you can eat) media service come into proximity and automatically and silently detect each other (e.g., via Bluetooth, WiFi, or infrared, or other short range electronic communication means) and proceed to share copies of all of the unique files present in total (w/o user intervention) so that each ends up with every possible file (capacity permitting). This being a subscription service, users can enjoy the fresh content at their leisure, delete it, or ignore it as it is prioritized to drop out if space is otherwise needed.

Users acquire new content without waiting for downloads and without incurring carrier network data charges. Carrier networks are not loaded, Users get pleasure from the element of surprise.

In one embodiment, users share only all the previews due to limited time in proximity or limited storage capacity.

In an a la carte model, full tracks are exchanged though only enabled for preview. Users may purchase at leisure.

In one embodiment, user devices are automatically aware of all content stored on nearby devices. When any user attempts to download content from the service, the phone pulls a nearby copy if available rather than using the carrier network.

Figure 1:
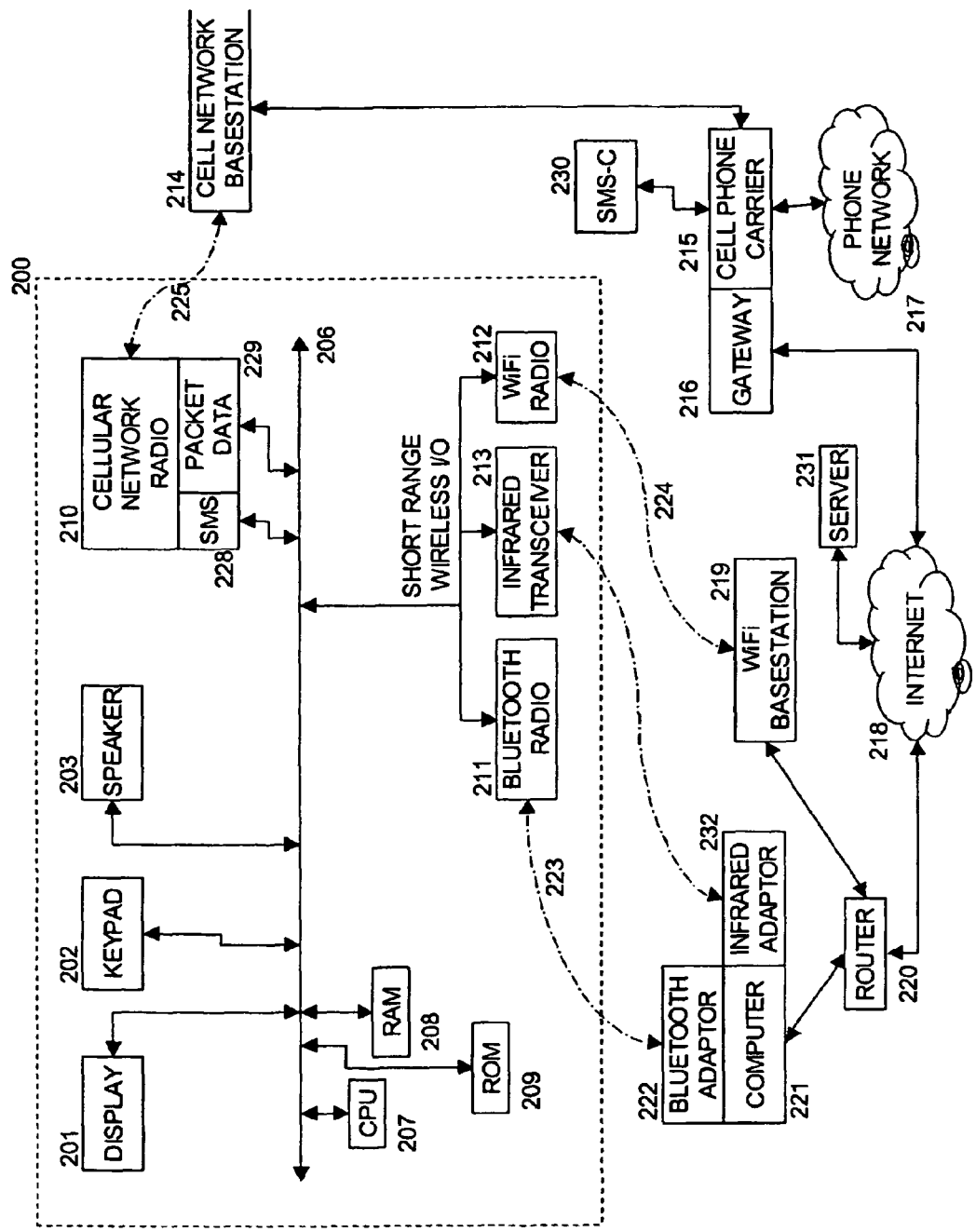
FIG. 1 is a block diagram of an embodiment of a content distribution system.

FIG. 1 is a block diagram of an embodiment of a content distribution system. A mobile phone 200 may receive the content from a network source. Messages are presented one the screen 201 and through the speaker(s) 203. The screen is also used in the user selection of recipients. A data bus 206 connecting the various elements within the phone. A processor 207 and random access memory 208 and persistent memory 209 (which could be re-writeable FLASH memory).

A radio 210 is provided to communicate via a medium range (up to many kilometers) microwave link 225 with cellular wireless voice and data network base stations 214 through their associated mobile phone carrier 215 and onward, either though a phone network 217 or through a gateway 216 to a public or private data network 218 such as the Internet. By pathways 217 and 218 the phone 200 may communicate to other mobile phones and other devices such as computers 221 and servers 231. The radio 210 can send and receive both Short Message Service (SMS) messages 228 through the phone network(s) 215 217 to other phones identified by their phone numbers and send a variety of data 229 protocols (UDP, TCP, SMTP, HTTP, etc) through the data network 218.

The phone 200 may include at least one of a variety of short-range wireless communication interfaces, including Bluetooth 211, Wireless Fidelity (WiFi) 212, and infrared 213. The Bluetooth radio 211 may communicate via short range microwave links 223 (10s of meters) with Bluetooth adaptors 222 connected to computers 221 and by extension through them via a router 220 to other devices on a public or private data network 218 such as the Internet. The Bluetooth radio 211 may communicate directly to other similarly enabled mobile phones The Wireless Fidelity (WiFi) radio 212 is able to communicate via short range microwave links 224 (10s-100s of meters) with WiFi base stations 219 connected via a router 220 (which may be incorporated into 219) to a public or private data network 218 such as the Internet. The Wireless Fidelity (WiFi) radio 212 may also communicate directly to other similarly enabled mobile phones.

The infrared transceiver 213 may communicate with infrared adaptors 232 connected to computers and by extension through them via a router 220 to other devices on a public or private data network 218 such as the Internet. The infrared transceiver 213 may also communicate directly to other similarly enabled mobile phones.

Connected to the data network 218 is a server complex 231 enabling the download of protected (encrypted) digital media files to the phone 200 and digit content keys to unlock the protected content for use on phones properly authenticated.

Connected to the cell phone carrier 215 is a short message service center 230 (SMSC) enabling transmission of messages between phones routed by their phone number and between the server complex 231 and phones.

Figure 2:
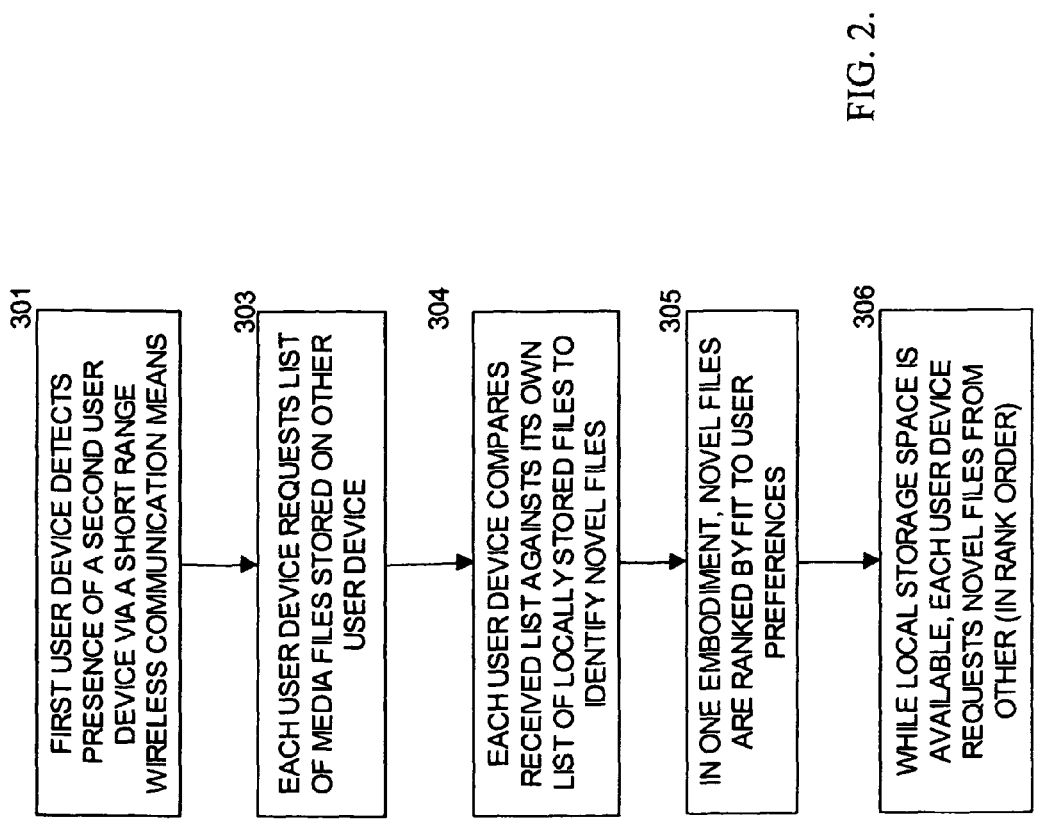
FIG. 2 is a flow chart of a process of proximity detection and synchronization of media between devices.

FIG. 2 is a flow chart of an embodiment of a process of proximity detection and synchronization of media between devices. As shown in FIG. 2, first at a block 301, a first user device detects presence of a second user device via a short range wireless communication means. At block 303, each user device requests and receives a list of media files stored on the other user device. At block 304, each user device compares the received list against its own list of locally stored files to identify novel files. At block 305, in one embodiment, novel files are ranked by fit to user preferences. At block 306, while local storage space is available, each user device requests (and receives) the novel files from the other device based upon the ranking.

Note that each device may be completely unrelated and unaffiliated with one another both before and after the exchange. The devices may have different owners and users, and the contact and exchange between the devices may be the only interaction, direct or indirect, that the devices ever have. The exchange of content may take place based on proximity and capability alone, and may occur automatically, without user intervention or initiation, and to an extent permitted by settings of the devices.

A mobile phone 200 or other device may comprise logic to carry out actions described herein, including those actions described in conjunction with FIG. 2.

Figure 3:
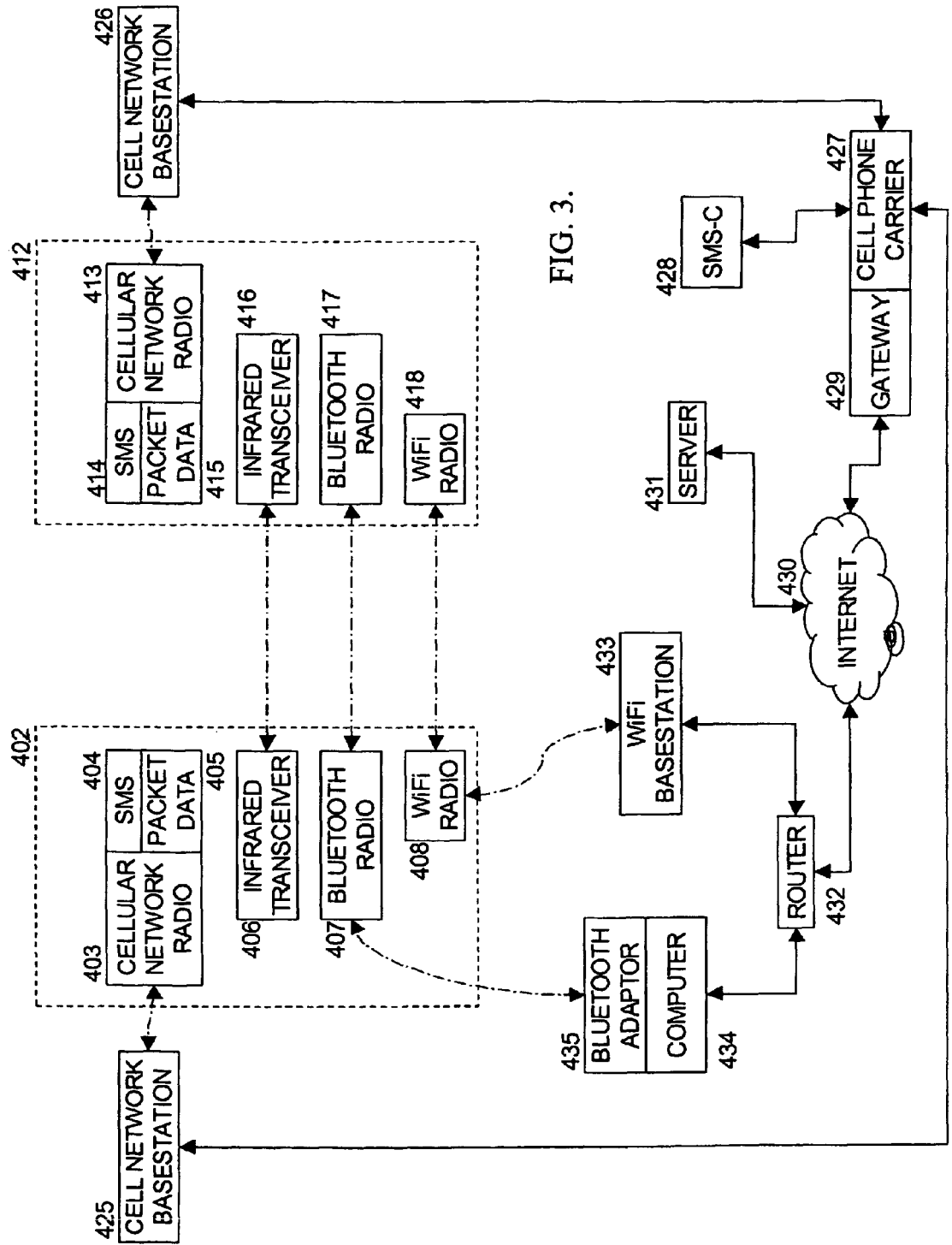
FIG. 3 is a block diagram of an embodiment of a content distribution system.

FIG. 3 is a block diagram of an embodiment of a content distribution system. As shown in FIG. 3, Mobile phones 402 and 412, each equipped with cellular network radios transceivers 403 413 are connected to SMS 404 414 or packet data 405 415 components.

The radios 403 413 communicate with cellular wireless voice and data network base stations 425 426 through their associated mobile phone carrier 427 and onward, through a gateway 429 to a public or private data network 430 such as the Internet. By 430 the phones 402 412 may communicate to each other and to other mobile phones and other devices such as computers 434 and servers 431 connected to 430.

The radios 403 413 can send and receive both Short Message Service (SMS) messages 404 414 through the phone network(s) 427 to other phones identified by their phone numbers and send a variety of packet data 405 415 protocols (UDP, TCP, SMTP, HTTP, etc) through the data network 430.

At least one of a variety of short range wireless communication interfaces may be employed, including Bluetooth 407 417, Wireless Fidelity (WiFi) 408 418, and infrared 406 416.

The Bluetooth radio 407 may communicate with Bluetooth adaptors 435 connected to computers 434 and by extension through them via a router 432 to other devices on a public or private data network 430 such as the Internet. The Bluetooth radio 407 is able also communicate directly to other similarly enabled mobile phones 412.

The Wireless Fidelity (WiFi) radio 408 is able to communicate with WiFi base stations 433 connected via a router 432 (which may be incorporated into 433) to a public or private data network 430 such as the Internet. The Wireless Fidelity (WiFi) radio 408 may also communicate directly to other similarly enabled mobile phones 412.

The infrared transceiver 406 may communicate with infrared adaptors (not shown) connected to computers and by extension through them via a router 432 to other devices on a public or private data network 430 such as the Internet. The infrared transceiver 406 may also communicate directly to other similarly enabled mobile phones 412.

Connected to the data network 430 is a server complex 431 enabling the download of protected (encrypted) digital media files to the phones 402 412 and digit content keys to unlock the protected content for use on phones properly authenticated.

Connected to the cell phone carrier 427 is a short message service center 428 (SMSC) enabling transmission of messages between phones routed by their phone number.

Figure 4:
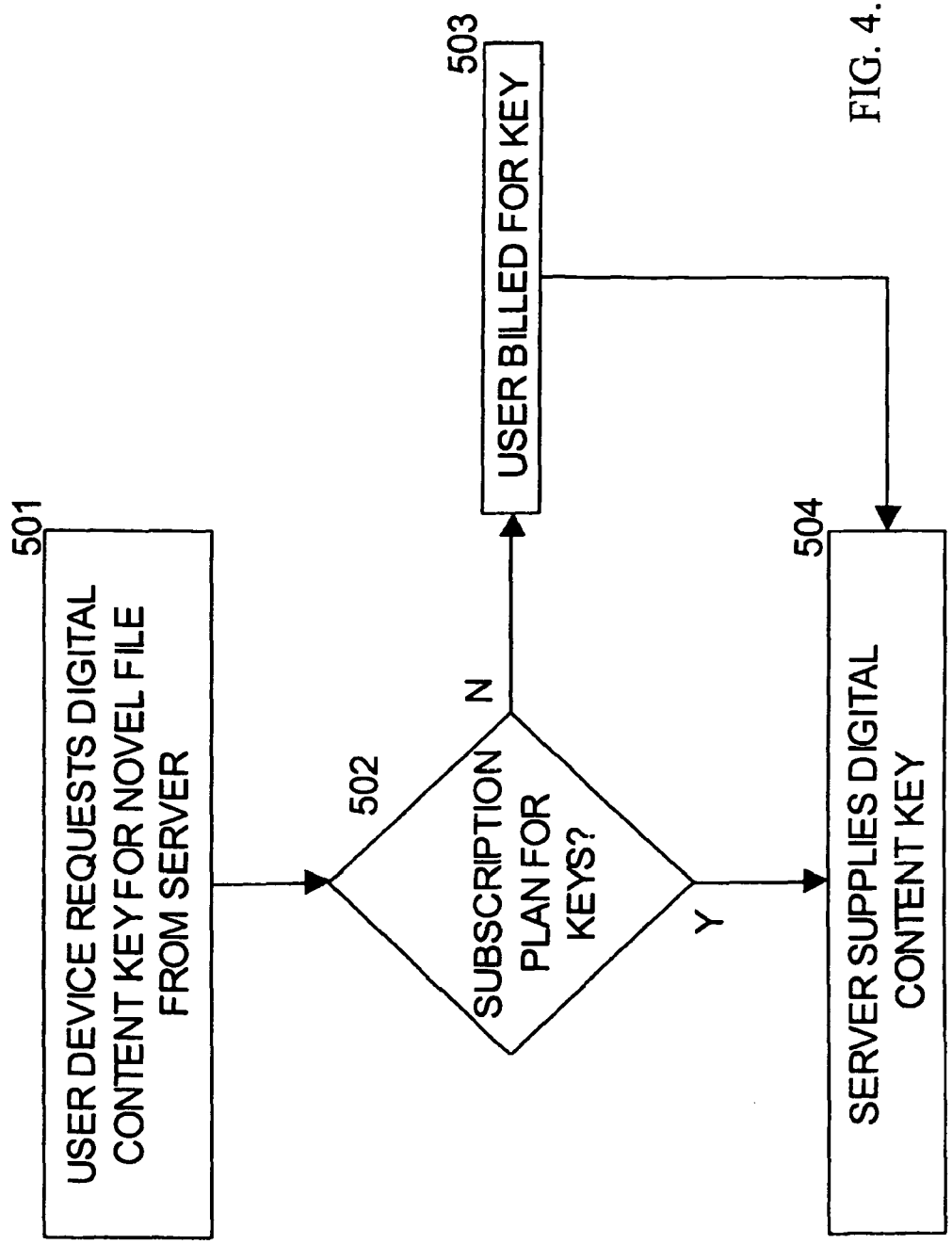
FIG. 4 is a flow chart of an embodiment of a process to charge for content.

FIG. 4 is a flow chart of an embodiment of a process to charge for content. As shown in FIG. 4, the user device requests from the server a digital content key for each new/novel file requested from the other user device, see block 501. At block 502, the server determines if a subscription plan for keys is currently active for the user associated with the requesting device. If there is no subscription, the user is billed for the key, block 503, and the server supplies the digital content key to the user device, block 504.

A mobile phone 200 and/or network content source may comprise logic to carry out actions described herein, including those actions described in conjunction with FIG. 4.

In an a la carte model, full tracks are exchanged though only enabled for preview. Users may purchase at leisure.

In one embodiment, devices are automatically aware of all content stored on nearby devices. When any user attempts to download content from the service, the phone pulls a nearby copy if available rather than using the carrier network.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method comprising:
   a mobile device detecting another device that is proximate;
   the mobile device and the detected device wirelessly exchanging a list of media files stored each device which are from a particular common subscription content source subscribed to by both devices;
   each user device compares the received list against its own list of locally stored filed to identify unique files;
   each device ranking any files that are unique according to how the files fit preferences of the user of the device performing the ranking; and
   the mobile device and the detected device each determining limits on their respective available local storage capacity;
   the mobile device and the detected device exchanging all content of the common subscription content source which is unique to each device in an order determined by the ranking, to the extent of the respective available local storage capacity, without authorization from the common subscription content source to exchange the content, and
   the mobile device and the detected device exchanging full copies of the content of the common subscription content source identified as unique to each device, the full content enabled only for preview.

2. The method of claim 1, further comprising:
   the mobile device processing a request from a user of the mobile device to unlock content obtained from the other device, and requesting from the content source one or more digital content keys to unlock the content.

3. A method comprising:

a mobile device detecting another device that is proximate;

the mobile device and the detected device wirelessly exchanging a list of media files stored on each device which are from a particular common subscription content source subscribed to by both devices;

each user device compares the received list against its own list of locally stored filed to identify unique files;

each device ranking any files that are unique according to how the files fit preferences of the user of the device performing the ranking; and the mobile device and the detected device each determining limits on their respective available local storage capacity;

the mobile device and the detected device exchanging all content of the common subscription content source which is unique to each device in an order determined by the ranking, to the extent of the respective available local storage capacity, without authorization from the common subscription content source to exchange the content, the mobile device and the detected device exchanging full copies of the content of the common subscription content source identified as unique to each device, the full content enabled only for preview, and otherwise, downloading the content from the wireless network subscription content source.

4. The method of claim 3, further comprising:

the mobile device processing a request from a user of the mobile device to unlock content obtained from the other device, and requesting from the wireless network subscription content source one or more digital content keys to unlock the content.

5. A mobile device comprising:

machine memory or circuits comprising logic to wirelessly detect another device that is proximate;

machine memory or circuits comprising logic to wirelessly exchange a list of media files stored on each device which are from a particular common subscription content source subscribed to by both devices;

machine memory or circuits comprising logic to compare the received list against its own list of locally stored filed to identify unique files;

machine memory or circuits comprising logic to rank any files that are unique according to how the files fit preferences of the user of the device performing the ranking; and machine memory or circuits comprising logic to determine limits on a respective available local storage capacity of the device performing the ranking;

machine memory or circuits comprising logic to exchange all content of the common subscription content source which is unique to the device in an order determined by the ranking, to the extent of its respective available local storage capacity, without authorization from the common subscription content source to exchange the content, and machine memory or circuits comprising logic to exchange full copies of the content of the common subscription content source identified as unique to each device, the full content enabled only for preview.

6. A mobile device comprising:

machine memory or circuits comprising logic to wirelessly detect another device that is proximate;

machine memory or circuits comprising logic to wirelessly exchange a list of media files stored on each device which are from a particular common subscription content source subscribed to by both devices;

machine memory or circuits comprising logic to compare the received list against its own list of locally stored filed to identify unique files;

machine memory or circuits comprising logic to rank any files that are unique according to how the files fit preferences of the user of the device performing the ranking; and machine memory or circuits comprising logic to determine limits on a respective available local storage capacity of the device performing the ranking;

machine memory or circuits comprising logic to exchange all content of the common subscription content source which is unique to the device in an order determined by the ranking, to the extent of its respective available local storage capacity, without authorization from the common subscription content source to exchange the content, machine memory or circuits comprising logic to exchange full copies of the content of the common subscription content source identified as unique to each device, the full content enabled only for preview, and otherwise, to download the content from the wireless network subscription content source.

7. The mobile device of claim 6, further comprising:

machine memory or circuits comprising logic to process a request from a user of the mobile device to unlock content obtained from the other device, and to request from the wireless network subscription content source one or more digital content keys to unlock the content.

* * * * *